United States Patent [19]
Skidmore

[11] 3,760,633
[45] Sept. 25, 1973

[54] METHOD AND APPARATUS FOR BALANCING PNEUMATIC TIRE AND SUPPORT

[76] Inventor: Frank O. Skidmore, 2513 Third St., Cuyahoga Falls, Ohio 44221

[22] Filed: July 14, 1971

[21] Appl. No.: 162,552

Related U.S. Application Data

[63] Continuation-in-part of Ser. No. 667,573, Sept. 13, 1967, abandoned, and a continuation-in-part of Ser. No. 761,360, June 26, 1968, Pat. No. 3,595,068.

[52] U.S. Cl. .................................. 73/66, 73/487
[51] Int. Cl. .................................. G01m 1/12
[58] Field of Search .................. 73/66, 480, 481, 73/487

[56] References Cited
UNITED STATES PATENTS

| | | | |
|---|---|---|---|
| 3,595,068 | 7/1971 | Skidmore | 73/66 |
| 3,177,725 | 4/1965 | Johnson | 73/480 |
| 2,378,237 | 6/1945 | Morris | 73/67.6 |

*Primary Examiner*—James J. Gill
*Attorney*—Albert H. Oldham et al.

[57] ABSTRACT

The method of substantially dynamically and statically balancing a pneumatic tire and its support wheel or rim which includes the steps of
1. measuring the distance that sidewall and/or tread portions of the tire extend axially from the support to determine any differences in these distances.
2. compensating for any differences in the distances by securing a compensating weight on the support diametrically opposite to the greatest difference distance to thereby balance statically with a compensating weight, positioned on the opposite side of the tire support in alignment in an axial direction.

The apparatus for substantially dynamically and statically balancing a pneumatic tire and its support wheel or rim includes a plurality of radically extending arms, roller means on certain of the arms and adapted to engage with the tire support to rotatably support the hub and arms thereon, and gage means mounted on at least one arm to measure the distance that sidewall and/or tread portions of the tire extend axially from the support to determine any difference in these distances.

1 Claim, 8 Drawing Figures

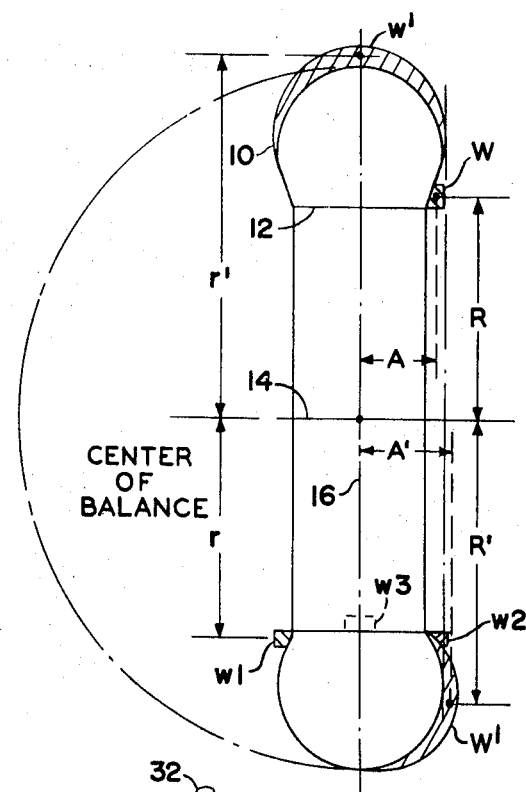
DYNAMIC BALANCE
$W' \cdot R' \cdot A' = W \cdot R \cdot A$
STATIC BALANCE
$(W \cdot R) + (w' \cdot r') = (W' \cdot R') + [(w1 + w2) \cdot r]$
FIG. 1
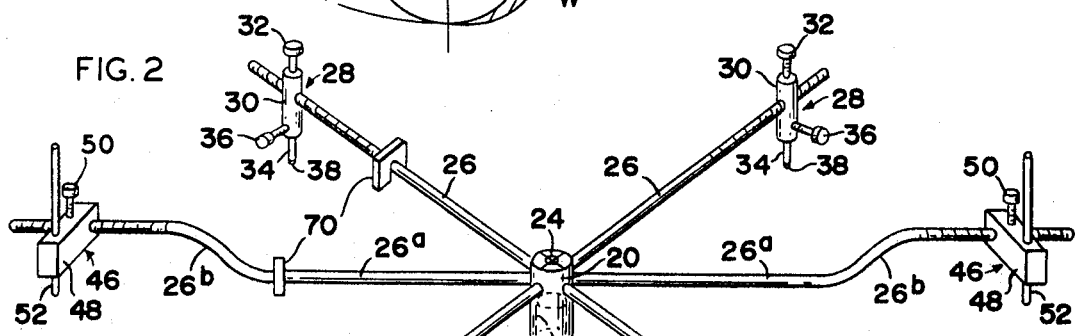
FIG. 2
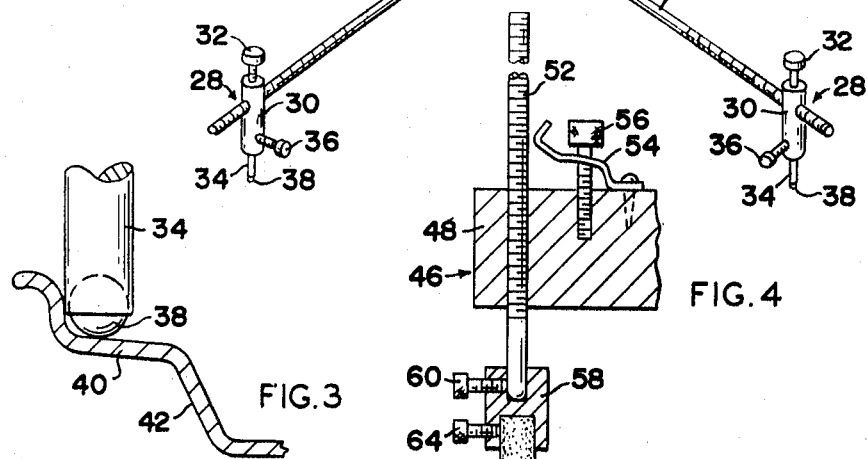
FIG. 3
FIG. 4

METHOD AND APPARATUS FOR BALANCING PNEUMATIC TIRE AND SUPPORT

This application is a continuation-in-part of my application Ser. No. 667,573, filed Sept. 13, 1967, now abandoned and my application Ser. No. 761,360, filed June 26, 1968, now U.S. Pat. No. 3,595,068, issued July 27, 1971.

It is the object of the invention to provide relatively inexpensive apparatus and methods for quickly, with good accuracy, balancing a pneumatic tire and its wheel or rim support both dynamically and statically. Present bubble-balancing or spindle type balancing equipment can only achieve static balance, not dynamic.

In the drawings:

FIG. 1 is a diagrammatic cross-sectional view of a tire and its support showing areas of dynamic and static unbalance and formulas for effecting balance;

FIG. 2 is a perspective view of one embodiment of apparatus of the invention;

FIG. 3 is an enlarged fragmentary view of a tire support with an associated roller means of FIG. 2;

FIG. 4 is an enlarged fragmentary cross-sectional view of a gage means from FIG. 2.

Figure 5:
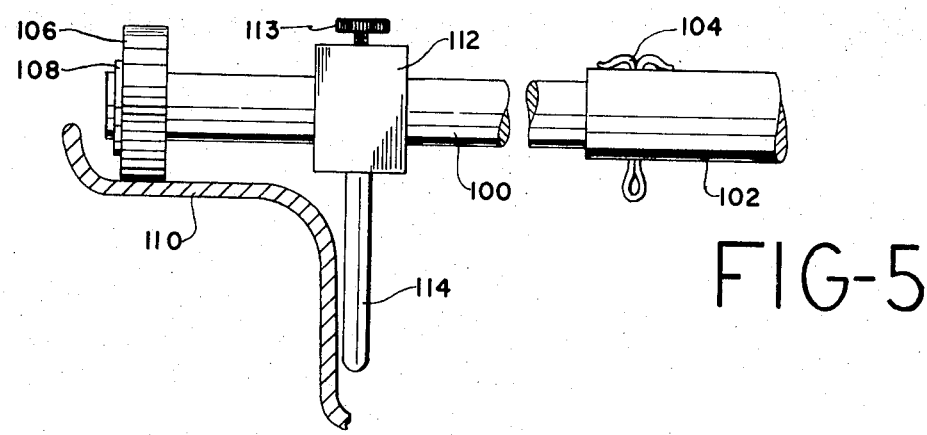
FIG. 5 is an enlarged broken away cross-sectional view of a modified embodiment of the invention.

The schematic showing of FIG. 1 includes a penumatic tire 10 carried on a support wheel or rim 12. The tire 10 is shown with an exaggerated statically out-of-balance tread area $w^1$ at a distance $r^1$ from the axis of rotation 14. The tire 10 is also shown with an exaggerated dynamically out-of-balance sidewall area $W^1$ at a distance of $R^1$ from the axis of rotation 14. The sidewall area $W^1$ is at a distance or moment arm $A^1$ from the center plane 16 of the tire support 12.

When the tire 10 of FIG. 1 is spun on axis 14 the sidewall unbalance area $W^1$ throws the tire into a dynamically unbalanced condition tending to twist the center plane 16 to other than a right angle with axis 14 and causing wobble, bearing wear, uneven tread wear, and an unsafe driving condition.

To substantially balance the tire of FIG. 1 dynamically without spinning for almost all practical cases a weight $W$ is secured to the tire support 12 diametrically opposite to the area $W^1$. The center of mass of weight $W$ is at a distance $R$ from axis 14 and at an axial distance $A$ from center plane 16. Therefore, substantial dynamic balance is achieved when $$W^1 . R_1 . A^1 . = W.R.A.$$

since and as the tire is spun on axis 14 all forces tending to tilt center plane 16 at other than right angles to axis 14 are counter-balanced. This assumes, of course, that $W^1$ is the only weighted area causing dynamic unbalance which is true in most practical tire balancing situations. Naturally, it should be understood that if weight $W$ will cause a greater static unbalance when positioned diametrically opposite area $W^1$ it should then be placed on the opposite side of the rim as indicated by weight $w^1$ in FIG. 1, as this also follows the formula above.

The amount of weight $W$ to effect counter-balance is a function or factor of the distance of the axially parallel offsetting of area $W^1$. In a great many cases area $W^1$ is caused not by faulty sidewall construction of the tire, but because the tire is seated on the rim in a cocked relationship. In other words, the plane of the tire does not coincide with the plane of the rim. This cocked relationship causes sidewall and tread offset and misalignment with the rim, and consequent dynamic unbalance. If the distance of the sidewall offset is one-half inch a larger weight $W$ will have to be used than if the axial offset is only one-eighth inch. In any event, the amount of the axial offset is measured (as hereinafter described) and a table is established equating each difference in offset distance to a given weight for selected tire sizes, testing bearing loads dynamically to insure best dynamic balance, and this table, or a series thereof, is supplied with the apparatus to the customer. The computation of the table does not comprise a part of the invention, but depends on the size and characteristics of the tire being balanced and normally is computed by trial and error on the standard tires in each size as made by the major rubber companies.

The invention contemplates that any method to determine the area of laterally displaced weight in the tread or sidewall of the tire will meet the objects of the invention. The simplest method appears to be a simple physical measurement such as with the tool defined hereinafter, but this measurement might be made at the factory by x-ray, ultrasonic, or physical measurement as typical examples, and the tire marked at the point of the laterally displaced heavy area, to later be balanced at the point of installation.

Figure 8:
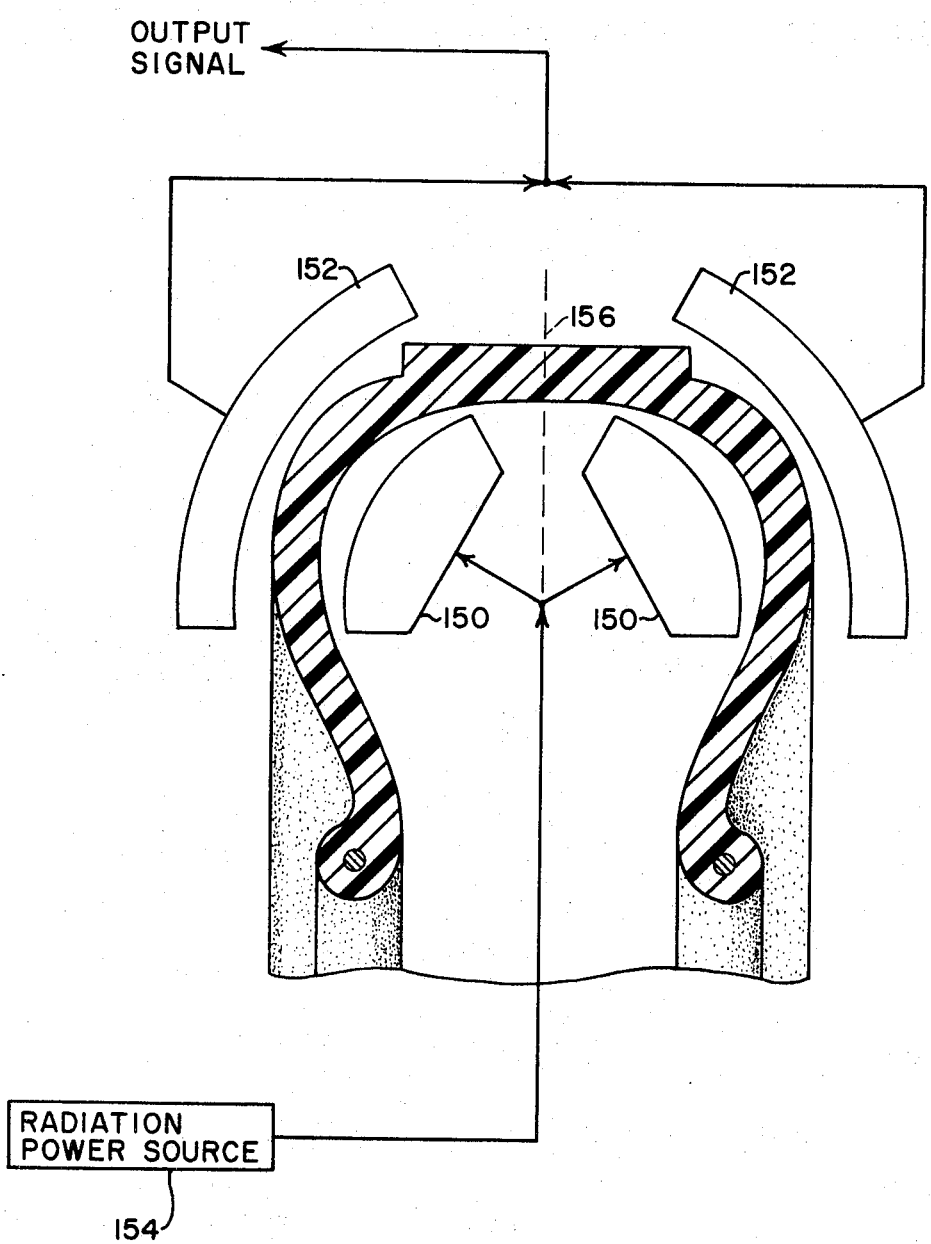
FIG. 8 is a schematic illustration of a radiation detector for determining laterally displaced heavy areas for factory marking, for example.

FIG. 8 illustrates a modified method to determine heavy areas or laterally offset areas. It comprises a factory installation for determining laterally offset areas of a tire and which areas are thicker and heavier. It includes sensor means 150 and 152 cooperating with a radiation source 154 such as, as x-ray for example, to pulse and test sidewall and tread thickness and displacement from a central tire axis. The source 154 produces an output drive signal to sensor means 150 and means 152 produces an output signal which is representative of the tire sidewall and tread density, thickness and position from a central rotating plane. This type of apparatus could also be ultrasonic actuated and include some mechanical means to determine lateral offset, with the x-ray or ultrasonic simply determining sidewall and tread thickness and/or density. Typical apparatus to effect the density measurement is illustrated in U.S. Pat. No. 2,378,237.

Normally for a static balance of any pneumatic tire and rim assembly, one weight placed at the proper position on the rim will suffice However, this single weight can be placed on either the inboard or outboard side of the rim and still be equally effective for a static balance of the assembly. The method of this invention, however, requires that the static balancing weight be positioned at the point on the rim opposite to the laterally displaced area of the tire so as to at the same time substantially correct a dynamic condition that a tire with a laterally displaced area will have during operation on a vehicle. Hence, if the tire has its heavy area on the outboard side, the weight will be positioned on the outboard rim opposite the heavy area. If the tire has its heavy area on the inboard side, the weight will be placed on the inboard rim opposite the heavy area.

I have found that better than a large number of the tires made today by the major rubber companies and particularly the wide tread tires have laterally displaced heavy areas normally caused by some slight cocking of the tire in the mold during cure. This method of balancing, based on determining the position of the laterally offset area, substantially solves both the dynamic and static problems at the same time with the use of much less weight to achieve the balance.

With the tire in substantial dynamic balance as described the tire lo is next tested for static balance on the usual vertical spindle machine. Test weight 70 as seen in FIG. 2, may be utilized to determine the amount and position of the weight necessary for static balance. Any static out-of-balance may be compensated for by a pair of weights $w^1$ and $w^2$, one placed on one side of the tire support 12 and the other placed in axial alignment on the other side of the tire support as shown. The weights $w^1$ and $w^2$ are both at a distance $r$ from the axis 14 and are diametrically opposite to the heavy side of the tire and its support. Placing the weights $w^1$ and $w^2$ equidistant from the center plane 16 does not upset the previously obtained substantial dynamic balance, but fully compensates to obtain static balance even though dynamic compensating weight $W$ may have upset static balance. A single weight $w^3$, indicated in dotted lines, could be centrally positioned on the rim to take the place of both weights $w^1$ and $w^2$.

Static balance is obtained, accordingly, when $(W.R)$ plus $(w^1.r^1) = (W^1.R^1)$ plus $[(W^1$ plus $W^2)$ $.r]$ Turning now to the apparatus of the invention, a hub-like portion 20 is generally provided having a skirt 22 which fits slidably down over the vertical spin dle of a conventional spindle-type static balancer for a tire and rim support. A bubble 24 showing true horizontal may be provided at the top of the hub, although this is not necessary since the bubble in the balancer will show through the open top of the hub. The purpose of the bubble on the hub portion 20 itself is to help determine if a rim is out of alignment, or if adding weight to compensate for dynamic out of balance changes the static balance condition.

A plurality of arms 26 extend radially from the hub, preferably at 90° spacing, the arms being calibrated in inches along their lengths. Roller means 28 are mounted on selected arms and include posts 30 locked in radially equal, but selected position, by set screws 32. A calibrated rod 34 is slidably received in each post 30 and is locked by set screw 36 at selected height therein. Each rod 34 rotatably carries a ball bearing 38 at its lower and adapted to roll upon the bead retaining flange 40 of a tire support 42 (See FIG. 3) when the apparatus is mounted on the vertical spindle type tire balancer, as aforesaid. Note however, that the apparatus could have only one arm carrying both roller means 28 and gage means 46 so long as it carries a circular skirt 22 to slidably engage over the spindle.

In the preferred embodiment of the invention, gage means 46 are mounted on at least one arm 26a. The arms 26a are preferably longer than 26 and diametrically opposed to each other and situated midway between adjacent arms 26. Also arms 26a are curved at 26b to allow the arms to follow the contour of a pneumatic tire. The gage means 46 includes a block 48 secured in radially selected position with a set screw 50.

A calibrated rod 52 extends slidably through the block, and is either locked in position in the block or given a selected sliding friction by a spring 54 secured to the block and adjustably forced into contact with the rod by thumb screw 56, all as best seen in FIG. 4.

The rod 52 may be rounded at its lower end to engage with a selected area of the sidewall or tread of the tire, or may have a cup 58 secured thereto with set screw 60, the cup receiving chalk or crayon 62 held in place by set screw 64.

In the operation of the apparatus described, with the hub 20, slidably received over the vertical spindle of a tire balancer, the posts 38 are adjusted to bring rollers 38 into contact with the bead flange 40 (FIG. 3) so that the entire apparatus of FIG. 2 can be rotated on the support 42 of the tire and the support being tested. Normally, skirt 22 will center the apparatus with respect to the bead flange 40, but with a minimum of two arms skirt 22 is not necessary if the rollers engage against the shoulder of the bead flange 40, as seen in FIG. 3. It should be understood that substantial dynamic unbalance can be determined without a static bubble balancer by the device of the invention rolling around the bead seat of the tire support rim. For plastic or non-ferrous supports 42 the flange 40 may not have a shoulder, however, making use of the skirt 22 necessary for contral positioning of the apparatus with respect to the spindle of a static balancer regardless of the number of arms 26. Substantial dynamic balance has been achieved under controlled testing conditions utilizing the device of the invention as described above.

Now at least one gage block 46 is adjusted to bring rod 52 over the sidewall or at the side of the tread of the tire under test and just into contact therewith. Thumb nut 56 provides light friction on the rod 52 allowing it to slide. The apparatus of FIG. 2 is rotated through at least 180° and axially offset side areas of the tire are either marked with chalk 62, or the distance of offset is measured by rod 52 sliding in block 48 or both. Once the distance of offset is known (such as area $W^1$) the proper weight $W$ can be selected and applied diametrically opposite thereto to achieve dynamic balance. The amount of weight is dependent on the amount of axial offset, and the size and characteristics of the tire.

It is preferable to substantially dynamically balance both sides of the tire and its support in the manner described. In almost all instances, it will be found that the opposite sides of the tire are 180° out of phase with respect to substantial dynamic balance so that the weights necessary to achieve substantial dynamic balance for both sides of the tire will statically cancel each other.

Next static balancing is effected as heretofore set forth, the bubble 24 facilitating this operation. However, to determine the amount of weight necessary for static balance the invention contemplates that small individual test weight 70, as seen in FIG. 2 of the drawings, might be slidably positioned by hand, on one of the arms 26a, with arm 26a in the proper radial direction. The weights 70 may be of various increments of weight, and one or more may be used and positioned in any radial relation on arm 26a until by trial and error with one or more test weights 70, the desired static balance is achieved. Normally, the weight or weights 70 are positioned in the same radial relation as the permanent weights which will be attached to the rim.

Also, note that the gage block 46 can be adjusted so that rod 52 might measure the radial out-or-round of the tread, as well as the axial displacement.

It should also be noted that the gage block 46 can be adjusted so that rod 52 might measure the axial distance from the rim on both sides to the point of attachment of the center support web of the rim defining the plane of rotation of the tire, rim, wheel combination, so that dynamic balance might be maintained where there is a difference in these axial distances, (especially true on the wide tread tire designs utilized today) by placing more weight when statically balancing with clip-on type weights on the side of the rim with the shorter distance to the support web defining the plane of rotation of the tire, rim, wheel combination. It has been found that the plane of rotation defined by the attachment point of the web normally carries the center of gravity of the rim and wheel when measured with the rim and wheel in a vertical plane. Therefore, it is usual in practicing the method of the invention to properly distribute clip-on type weights during the static balance so as to not disturb the previously determined substantial dynamic balance. Normally this will require positioning of a greater amount of weight on the outboard flange of the rim, than on the inner flange since the attachment point for the web of the rim is closer to the outboard flange than the inboard flange in the usual wheel rim combination.

FIG. 5 illustrates the arm arrangement of a modified embodiment of the invention which though operating the same, is a little different structurally. Specifically, in this embodiment, a pair of rods 100 and 102 are telescoped with relation to each other and held in a proper length position by appropriate cotter pin 104 to form each of the arms. A roller 106 is mounted to the end of rod 100 in fixed position by an appropriate lock washer 108. The roller 106 rolls on the rim 110 in the same manner as the roller 38 rolling on rim 40 as indicated in FIG. 3 of the drawings.

In this embodiment, however, a test is made for the roundness or trueness of the rim itself, and this is made by an adjustable sleeve 112 slidably received on rod 100 and held in position by an appropriate locking screw 114. The sleeve 112 has a downwardly projecting pin 114 extending from the bottom thereof which is adjusted so as to be in close adjacent relationship to the rim 110, as illustrated. Hence, it should be understood that upon rotation of the tool, and the arm established by rods 100 and 102, the trueness or circular roundness of the rim 110 will be measured by pin 114. Any major deviations, or course, will either have to be corrected, or will indicate that the rim is unacceptable for high speed automobile passenger tire operation.

Figure 6:
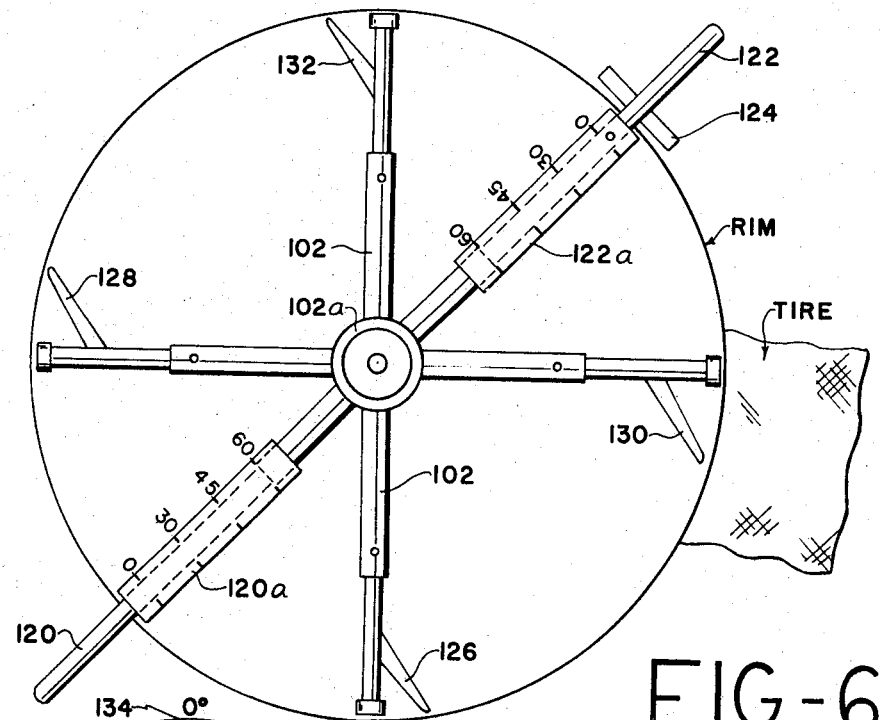
FIG. 6 is a plan schematic of the tool of FIG. 5 which illustrates some other attachments to the basic tool.

FIG. 6 illustrates a plane view of the tool shown in FIG. 5, and illustrates four posts 102 spaced at 90° to each other and held to a center hub 102a which is received around the spindle of a static balancing machine, as has been described above. However, FIG. 6 also illustrates a pair of arms 120 and 122 mounted in 180° relation to each other on hub 102a. They are positioned at 45° relation between adjacent arms 102, and serve to measure lateral tread displacement for dynamic balancing as described above. Each arm 120 and 122 mounts a plate 120a and 122a on which weight may be placed to determine the proper amount to statically counterbalance the heavy area designated at 124. The plates 120a and 122a operate in coordinator with arms 102 and pointers 126, 128, and 132 mounted thereto. In effect, each arm 102 marks a point on the rim in 45° relation on each side of arms 120 and 122. The pointers 126 and 128 mark a point on the rim in 60° relation on each side of arm 120 while pointers 130 and 132 mark a point on the rim in 60° relation on each side of arm 122.

The static balancing procedure with the tool is to place the hub 102a over the hub of a static balance device, and then to place either arm 120 or 122 os it lies over the center of gravity of the heavy area. This is followed by placing weight onto the respective place on the opposite arm until static balance is achieved. Note that the plates 120a and 122a are marked with 0°, 30°, 45°, and 60° designations. This means that weights piled on the plate adjacent the respective designation, when the bubble on a static balance device indicates proper balance, can be divided exactly in half, with half mounted to the rim at the specific angular designation from the plate indicated. However, it should also be understood that the amount of weight necessary to counterbalance at 0° can also be applied directly at the 60° indication by the respective pointers 126 and 128, or 130 and 132 depending on which arm is utilized without making the special determination adjacent the 60° indication on the plate.

Figure 7:
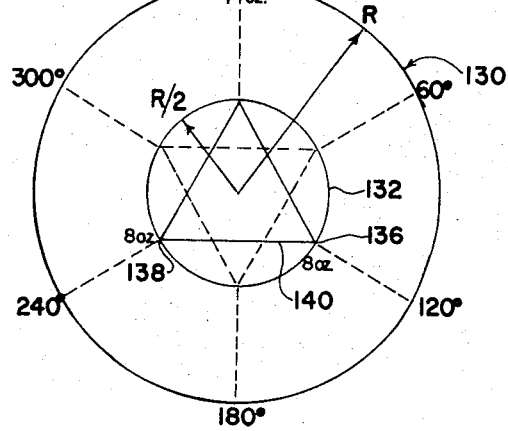
FIG. 7 is a schematic illustration showing how equal balance is achieved in the whole tire, rim, combination using the apparatus and method of the invention.

The optimum balance in a tire/wheel combination achieved by an equilateral balance such as the 120° relationship indicated in FIG. 6 of the drawings is shown in schematic form in FIG. 7. Specifically, this figure shows a relationship between a tire 130 and a rim 132 such that the tire has a radius $R$ and the rim has a radius $R/2$. A four ounce heavy area at 134 will require 8 ounces balancing compensation weight at points 136 and 138, respectively, on the rim at 120° spaced relationship from the radial position of the 4 ounce out-of-balance area 134. This generates an equilateral triangle illustrated by a solid line 140 and means that equal thrust will prevail throughout the entire tire/rim combination due to centrifugal force during rotational operation of the tire. This uniform distribution of weight means that exactly 4 ounces of thrust will be present at each of the 60° points marked around the periphery of the tire during rotational operation thereof. This can very greatly eliminate rough ride due to unequal radial or circumferential force distributions in the tire because of the unequal balance around the entire tire combination that may be present if a single lumped weight is utilized opposite the 4 ounce heavy area 124.

It is also possible utilizing the tool shown in FIG. 6 of the drawings to determine whether the heavy area 124 is spread over a long arcuate section of the tire, which is normally the case because of shifting of the tire during molding or whether the heavy area 124 is localized due to some local condition such as a radial lap splice, or some heavy localized condition within the rubber compounding itself. The technique to determine this relationsip is to simply determine the exact amount of weight necessary to counterblance the heavy area 124 on both plates 120b and 122b. The amount of weight necessary to counterbalance on plate 120b will be the same regardless of whether the heavy area is distributed or localized at 124. However, on plate 122b, it will be found that less weight is necessary to counterbalance at the 45° points shown by arms 122 and 122a when the heavy area 124 is spread over a longer arcuate distance than the heavy area is localized. A table can easily be made up to allow the operator of the tool to utilize this determination as to the extent of the heavy area being spread or localized, for it can be of great value to the factory to enhance quality control procedures. The proof of this method is quite easily accomplished by simply placing weights on the tire during use of such tool in either a localized heavy area or a spread heavy area, and actually counterbalancing on the 45° relationship with arms 122 and 122a, to show that different amounts of weight are necessary to counterbalance at the points designated by arms 122 and 122a, even though exactly the same amount of weight on plate 122b will indicate the counterbalance with the weight localized at 124 or spread out over a long arcuate distance.

Hence, it should be understood that the tool of the invention in combination with the balancing method described achieves the following improved features:

1. Can determine static balance on even an improperly operating static balance machine by use of the circular level placed over the center hub.

2. Can determine a warped rim by the four equal arms rolling around the rim. If the rim is warped, the arms will not contact equally and the warp can be detected.

3. Can determine out of round rims by the pins 14 extending down from the arms. Either one or more pins may be utilized on one or more of the arms.

4. The device can determine if the tire is out of balance over a long crescent area or a condensed area by means of the arms 102 and the 45° designation on either plate 120a or 122a.

5. The device locates the weight to the correct position for equilateral balance and equal centrifugal force thrust in the rotating tire by determining the correct amount of the weight and the position thereof by means of arms 122 and plates 120a and 122a.

6. The device locates dynamic unbalance in the majority of tire cases where lateral disproportionates may exist in the tread or sidewall of a tire and corrects for these unbalances with a properly positioned weight.

7. The device determines out-of-roundness in tires by an appropriate adaptor to one of the measuring arms.

While in accordance with the patent statutes only one best known embodiment of the invention has been illustrated and described in detail, it is to be particularly understood that the invention is not limited thereto or thereby but that the inventive scope is defined in the appended claims.

What is claimed is:

1. That method of substantially dynamically and statically balancing a combination pneumatic tire and its support assembly having a laterally offset heavy area which includes the sequential steps of
   a. directing a radiation waveform through the lateral side walls and tread area of the tire to determine the area of maximum thickness and density; and
   b. mounting the assembly on a static tire balance apparatus and positioning compensating weight on the support assembly on the same side of the tire and support assembly as the determined area at a point opposite such area so as to complete the static balance of the assembly as measured by the balancing apparatus, and also help compensate for the dynamic unbalance.

* * * * *